W. W. WARD.
HARROW AND DRAG.
APPLICATION FILED JULY 7, 1917.
1,254,095.
Patented Jan. 22, 1918.
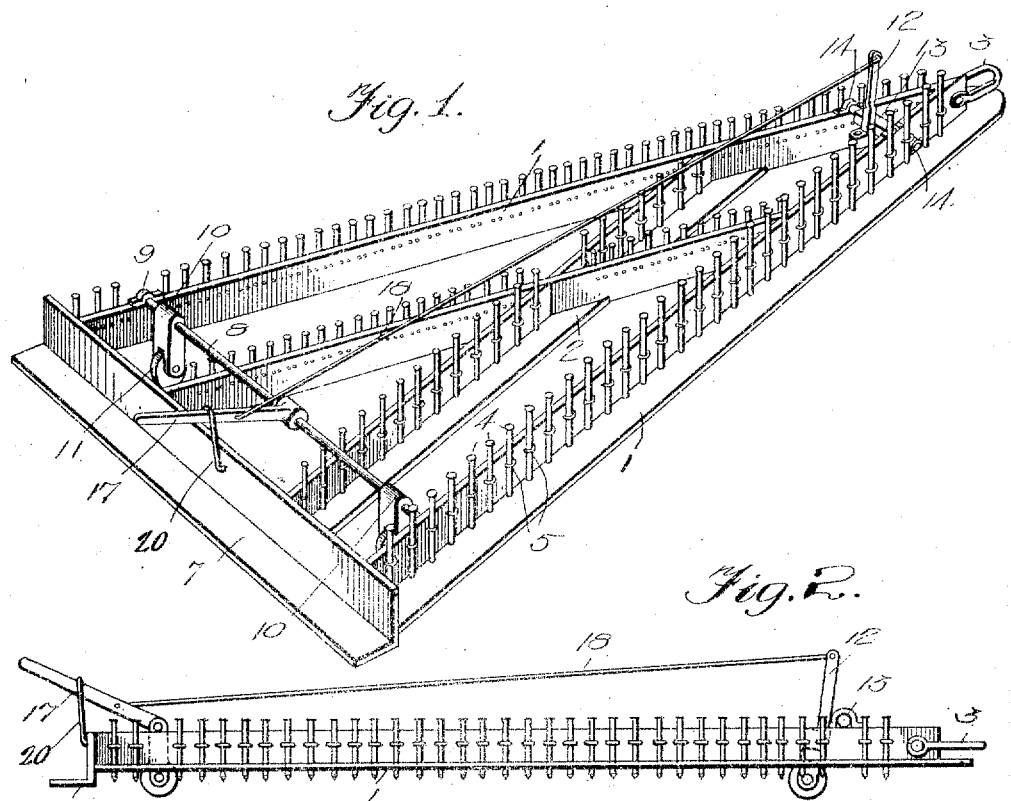
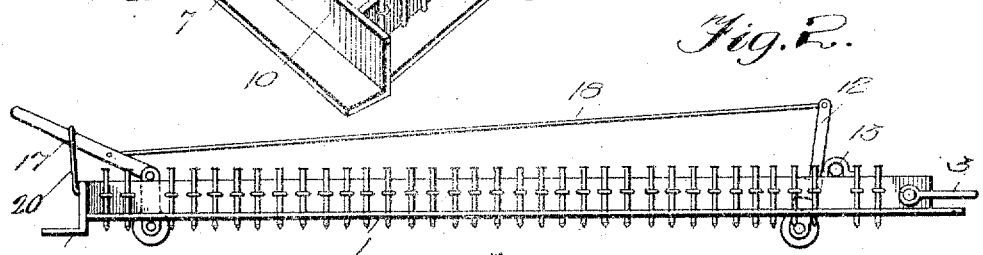
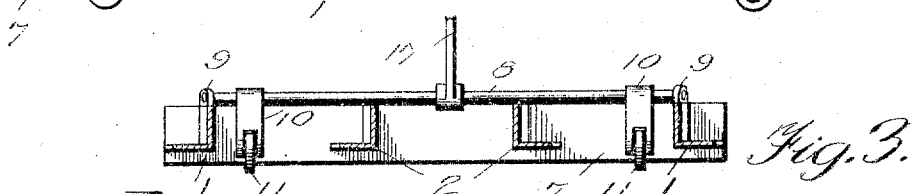
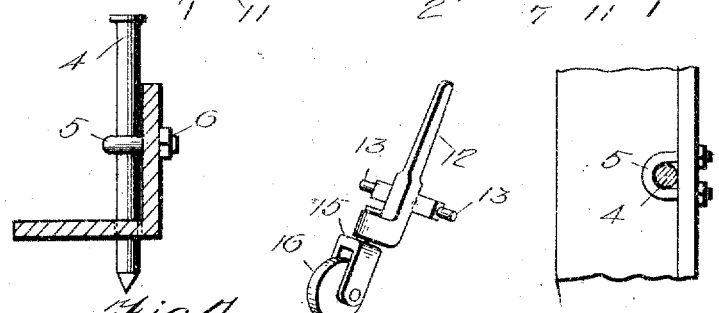
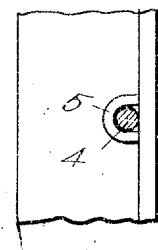
WITNESS
J. M. Lyles
INVENTOR
William W. Ward
BY
ATTORNEYS

UNITED STATES PATENT OFFICE.

WILLIAM WILLARD WARD, OF DUBLIN, GEORGIA.

HARROW AND DRAG.

1,254,095.  Specification of Letters Patent.  Patented Jan. 22, 1918.

Application filed July 7, 1917. Serial No. 179,202.

*To all whom it may concern:*

Be it known that I, WILLIAM W. WARD, a citizen of the United States, and a resident of Dublin, in the county of Laurens and State of Georgia, have invented new and useful Improvements in Harrows and Drags, of which the following is a specification.

My invention is an improvement in harrows and drags, and has for its object to provide mechanism of the character specified especially adapted for use in leveling roads, wherein a series of closely arranged slightly projected harrow teeth is provided supported by a suitable frame, for tearing up and scarifying the high places in the road, together with a drag for dragging the torn up and disintegrated material into the low places, and wherein mechanism is provided for supporting the harrow and drag out of contact with the road during transportation.

In the drawings:

Figure 1 is a perspective view of the improved harrow and drag;

Fig. 2 is a side view;

Fig. 3 is a transverse vertical section at the rear wheels;

Fig. 4 is a view of one of the harrow teeth;

Fig. 5 is a top plan view of Fig. 4.

Fig. 6 is a perspective view of one of the supporting wheels and its connections.

In the present embodiment of the invention, a substantially A-shaped frame is provided, composed of angle plates, the said frame consisting of side members 1 converging toward their front ends, and cross members 2 arranged parallel with the side members. Each of these cross and side members has one of its portions horizontal and the other vertical, the vertical portion being at the inner side of the horizontal portion. A clevis 3 is connected with the apex of the A-frame, and a series of harrow teeth is connected with each of the side and cross members. Each of these teeth 4 is passed through an opening in the horizontal portion of the angle plate and is held to the vertical portion by a substantially U-shaped clip 5. The arms of the clip are passed through openings in the vertical portion of the angle plate, and are engaged by nuts 6 to clamp the teeth to the angle plate. These teeth extend slightly below the horizontal portions of the angle plates, and the rear ends of the members 1 and 2 are connected by an angle plate 7 forming a drag.

This angle plate, as shown, has one of its portions horizontal and the other vertical, and the horizontal portion is spaced below the points of the harrow teeth, as shown more particularly in Fig. 2. It will be obvious that when the improved harrow and drag is drawn along the road to be leveled, the teeth will tear up and disintegrate the lumpy and elevated portions of the roadway, and the drag will remove these portions, filling them into the low parts of the roadway and leveling the hummocks of the roadway.

Means is also provided for lifting the frame to bring both the teeth and drag out of contact with the surface of the ground during transportation and the like. The said means comprises a shaft 8 journaled in bearings 9 on the side members 1, the said shaft being parallel with the drag, and arms 10 are secured to the shaft near the ends thereof. Each arm is forked at its lower end, and a wheel 11 is journaled in each of the arms. It will be obvious that when the shaft is oscillated to bring the arms 10 into vertical position the wheels will engage the ground and will lift the drag and the frame out of contact therewith, the arms 10 being of sufficient length for this purpose.

A lever 12 is journaled at the front of the frame, the said lever having oppositely extending journal pins 13 which are journaled in bearings 14 on the side members 1, and a yoke 15 is journaled in the lower end of the lever to swing on a vertical axis. A wheel 16 is journaled between the arms and the yoke, and a caster wheel is thus provided to permit the front end of the frame to be guided.

A handle or lever 17 is secured to the shaft 8 intermediate its ends, and a link 18 connects this handle with the upper end of the lever 12. A hook 20 is provided on the rear cross member or drag portion for engaging the lever 17 to hold the wheels in operative position.

In operation, the frame is transported to the place of use elevated out of contact with the ground by the wheel. When it is to be used the handle 17 is thrown forwardly, thus raising the wheels, and the teeth come into contact with the ground. As the frame is drawn forwardly the teeth will tear up and scarify the soil of the high places and hummocks, and the drag will remove this loosened soil, dragging it into the low places and smoothing and compacting the same.

The teeth are set close together, and are so arranged that the entire surface of the ground for the width of the harrow will be torn up. The teeth may be adjusted vertically.

I claim:

A road working implement, comprising a substantially triangular frame consisting of outer side members converging at their front, inner side members extending substantially parallel with the outer side members in spaced relation, teeth connected with each of the side members in close relation and extending below the said members and designed to tear up the soil, a drag forming the base of the frame and extending below the teeth and connected with the side members at their rear ends for smoothing the torn up soil, draft mechanism at the apex of the frame.

WILLIAM WILLARD WARD.